United States Patent
Shimosato

(10) Patent No.: US 10,652,451 B2
(45) Date of Patent: May 12, 2020

(54) IMAGE CAPTURE CONTROL APPARATUS AND CONTROL METHOD THEREOF

(71) Applicant: CANON KABUSHIKI KAISHA, Tokyo (JP)

(72) Inventor: Jiro Shimosato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/400,123

(22) Filed: May 1, 2019

(65) Prior Publication Data
US 2019/0349515 A1 Nov. 14, 2019

(30) Foreign Application Priority Data
May 14, 2018 (JP) .................. 2018-093225

(51) Int. Cl.
*H04N 5/232* (2006.01)
*H04N 5/3745* (2011.01)

(52) U.S. Cl.
CPC ..... *H04N 5/23212* (2013.01); *H04N 5/23229* (2013.01); *H04N 5/23293* (2013.01); *H04N 5/232945* (2018.08); *H04N 5/37452* (2013.01)

(58) Field of Classification Search
CPC ........... H04N 5/23212; H04N 5/23229; H04N 5/37452
See application file for complete search history.

(56) References Cited

U.S. PATENT DOCUMENTS

| 2010/0149402 A1* | 6/2010 | Aoki | H04N 5/23212 |
| | | | 348/333.12 |
| 2013/0314579 A1* | 11/2013 | Sasaki | G02B 7/28 |
| | | | 348/333.02 |

FOREIGN PATENT DOCUMENTS

| JP | 2010-141767 A | 6/2010 |
| JP | 2013-070164 A | 4/2013 |

* cited by examiner

*Primary Examiner* — Ahmed A Berhan
(74) *Attorney, Agent, or Firm* — Cowan, Liebowitz & Latman, P.C.

(57) ABSTRACT

An image capture control apparatus detects a more detailed part of a specific object from an image, and controls so as to if a predetermined condition is satisfied and there is a setting that makes it impossible to designate the detailed part as an AF target, not execute adjustment of a position in accordance with manual focus (MF) even if a specific operation is performed while an operation for the shooting preparation instruction continues, and if a predetermined condition is satisfied and there is a setting that makes it possible to designate the detailed part as an AF target, execute adjustment of a focus in accordance with MF in response to a specific operation being performed while an operation for the shooting preparation instruction continues.

10 Claims, 14 Drawing Sheets

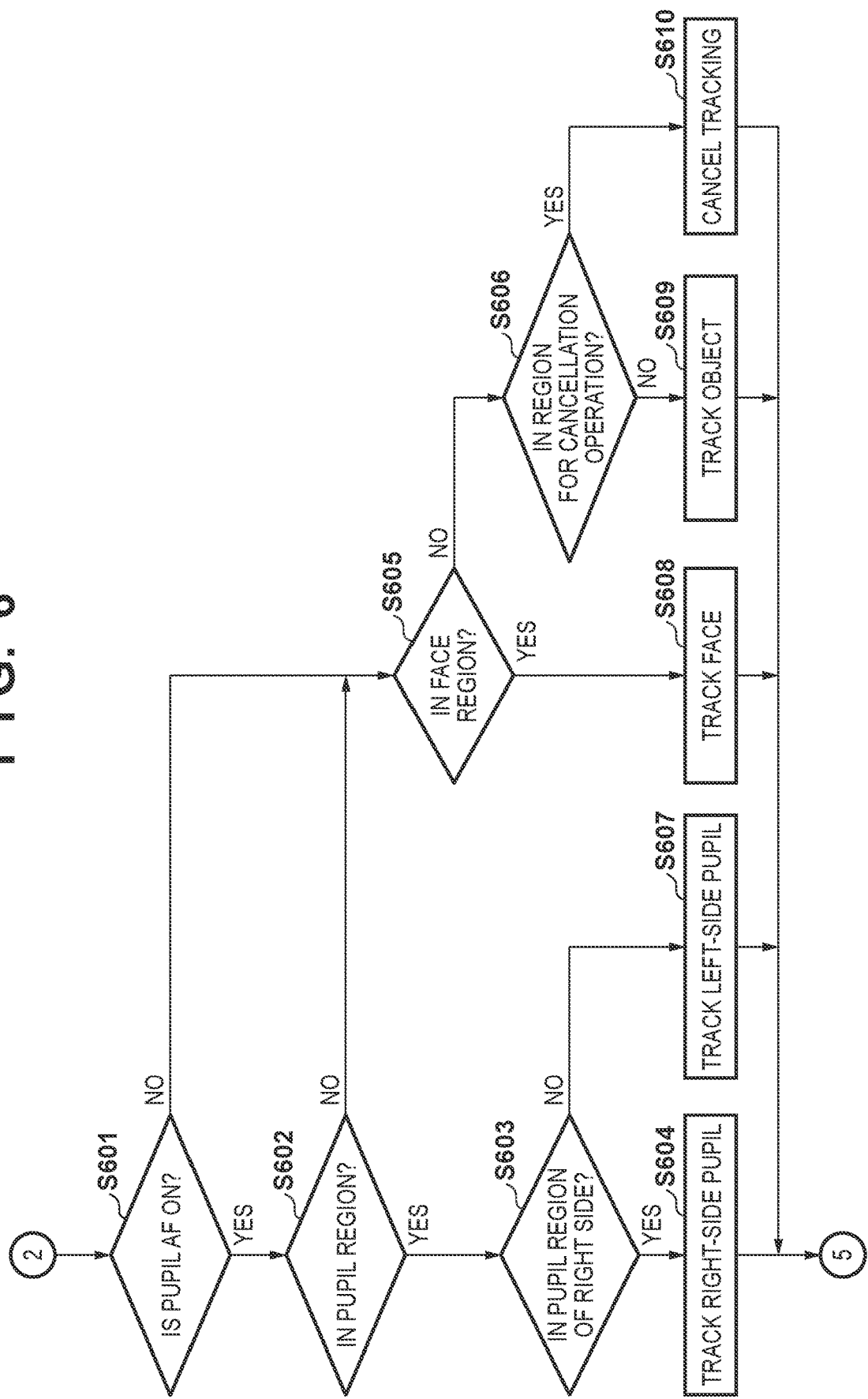

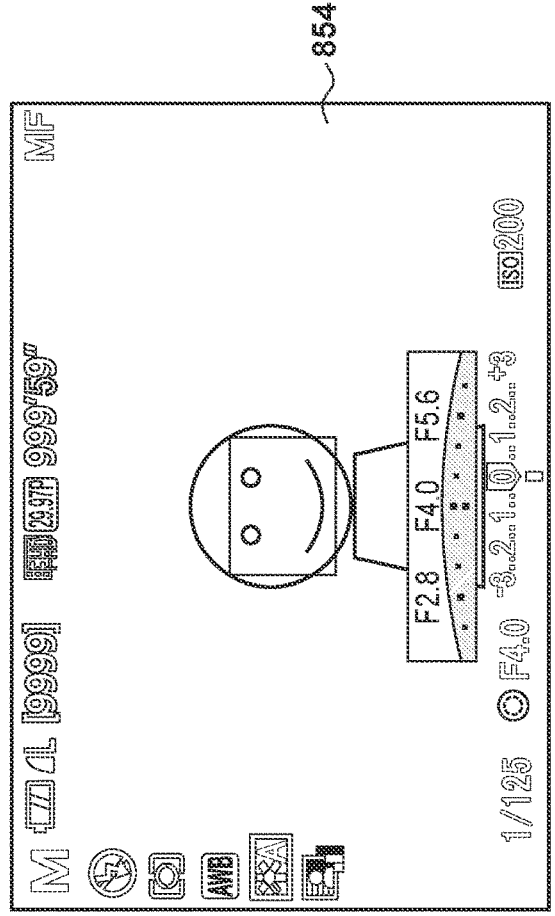
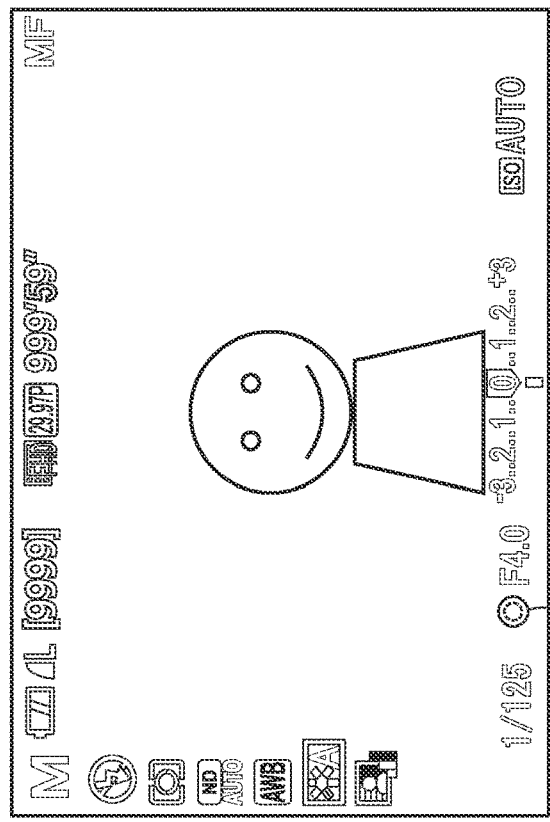
FIG. 8B

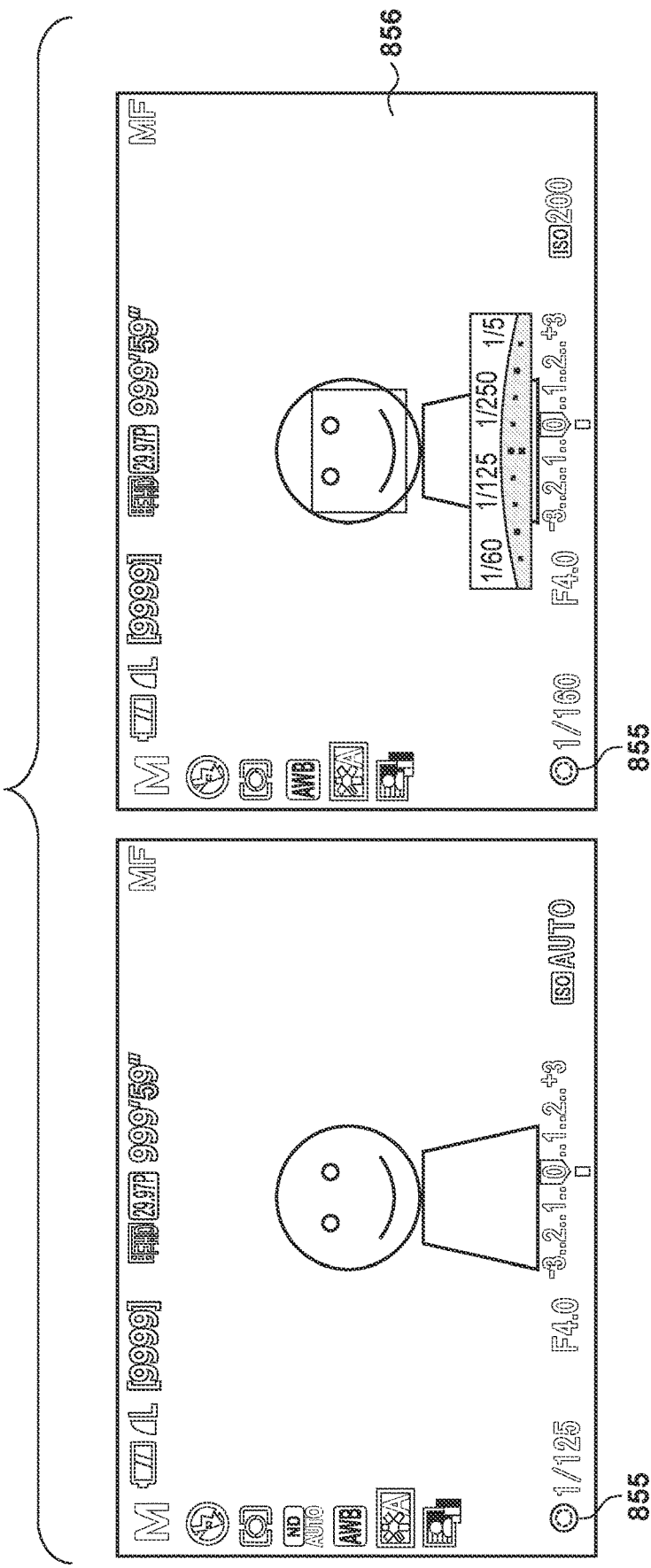

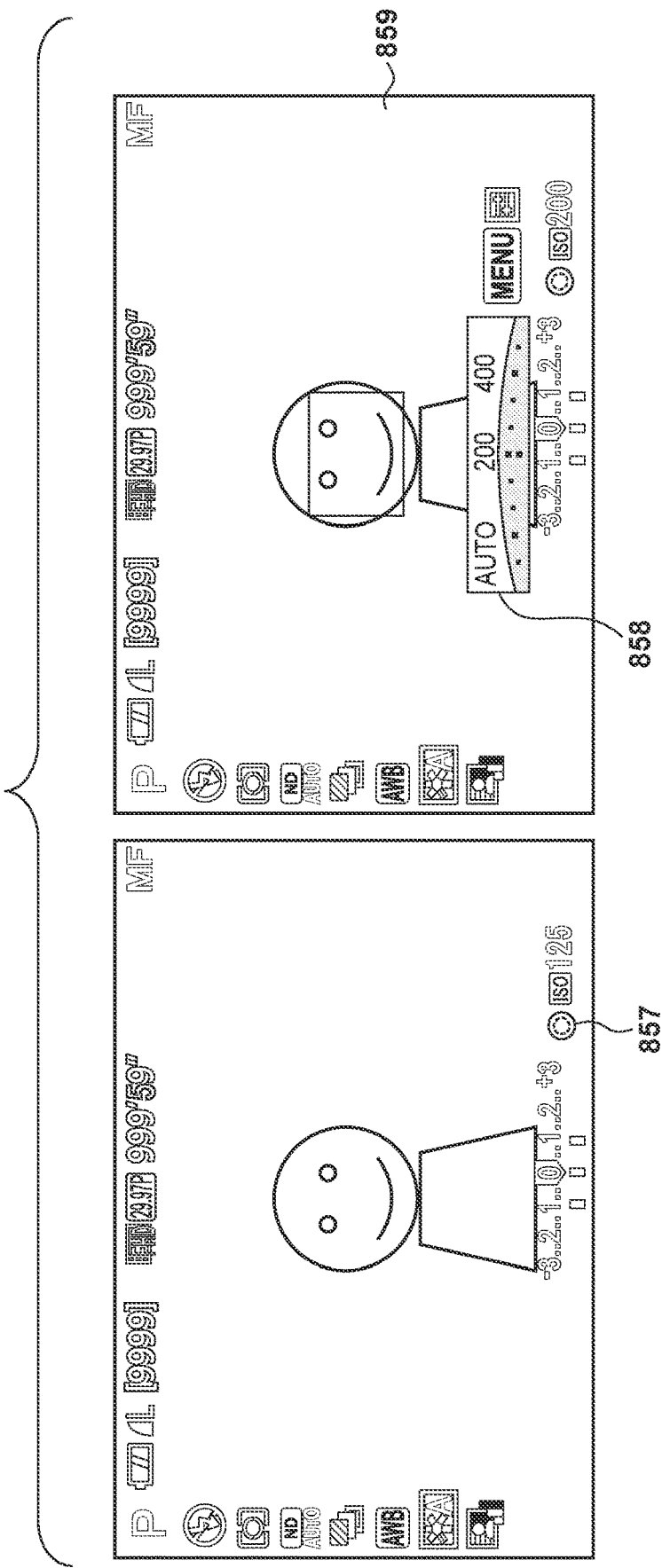

IMAGE CAPTURE CONTROL APPARATUS AND CONTROL METHOD THEREOF

BACKGROUND OF THE INVENTION

Field of the Invention

The present invention relates to an imaging control technique having an object detection function.

Description of the Related Art

An image capture control apparatus such as a digital camera is provided with an auto focus (AF) function that aligns focus with respect to an object automatically detected from an imaged image, or an object arbitrarily selected by a user. In addition to detecting the face of a person as a specific object, there are AF functions that can also detect an organ (part) of a face (for example, a pupil or the like), and are capable of AF with respect to a more detailed part of a specific object (hereinafter referred to as pupil AF). In pupil AF, by making it possible to select and distinguish one of a face and a pupil as an AF target position, it is possible to realize a function that can reflect a user's intention.

Japanese Patent Laid-Open No. 2013-70164 recites a technique for, by a user touching a screen, determining whether an object at a touched position is a face or a pupil, and selecting the object as an AF target. By this, a user becomes able to easily designate an AF target position in accordance with a shooting scene, and usability improves. Japanese Patent Laid-Open No. 2010-141767 proposes a camera system in which, after focusing by performing AF in accordance with a half press operation of a release button, it is possible to enlarge a focused region in accordance with an operation of a focus ring and adjust a focal position, while the half press operation of the release button is maintained.

However, in Japanese Patent Laid-Open No. 2013-70164, no attention is given to a function for finely adjusting a focus at a more detailed part after pupil AF. There is manual focus (MF) as a function for finely adjusting focus. In particular, as an MF function after AF (focusing), a function for temporarily accepting a focus adjustment operation after focusing by AF (hereinafter, AF+MF) is known as in Japanese Patent Laid-Open No. 2010-141767. In an AF+MF function, having the focus shift due to an erroneous operation after focusing by AF is prevented by setting enabled/disabled for the function in advance, and configuring to not execute MF even if a focus adjustment operation is made after focusing by AF if the AF+MF function is set to disabled. However, if the AF+MF function is set to disabled, performing an operation for finely adjusting the focus at a more detailed part after AF in which an organ (part) of a face is set as a target, such as pupil AF, ceases to be possible.

SUMMARY OF THE INVENTION

The present invention has been made in consideration of the aforementioned problems, and realizes techniques for making it possible to smoothly perform an operation for finely adjusting a focus at a more detailed part of a specific object.

In order to solve the aforementioned problems, the present invention provides an image capture control apparatus, comprising: a detector configured to detect a more detailed part of a specific object from an image, wherein the specific object is a part of the image; a memory and at least one processor and/or at least one circuit to perform the operations of the following units: a setting unit configured to set whether it is possible to designate the detailed part detected by the detector as an auto focus (AF) target; and a control unit configured to control so as to if a predetermined condition is satisfied and there is a setting that makes it impossible for the setting unit to designate the detailed part as an AF target, perform AF in accordance with a shooting preparation instruction, and not execute adjustment of a focus in accordance with manual focus (MF) even if a specific operation is performed while an operation for the shooting preparation instruction continues, and if a predetermined condition is satisfied and there is a setting that makes it possible for the setting unit to designate the detailed part as an AF target, perform AF in accordance with a shooting preparation instruction, and execute adjustment of a focus in accordance with MF in response to a specific operation being performed while an operation for the shooting preparation instruction continues.

In order to solve the aforementioned problems, the present invention provides a method of controlling an image capture control apparatus having a detector operable to detect a more detailed part of a specific object from an image, wherein the specific object is a part of the image, the method comprising: setting whether it is possible to designate the detailed part detected by the detector as an auto focus (AF) target; and controlling to if a predetermined condition is satisfied and there is a setting that makes it impossible to designate the detailed part as an AF target, perform AF in accordance with a shooting preparation instruction, and not execute adjustment of a focus in accordance with manual focus (MF) even if a specific operation is performed while an operation for the shooting preparation instruction continues, and if a predetermined condition is satisfied and there is a setting that makes it possible for the setting unit to designate the detailed part as an AF target, perform AF in accordance with a shooting preparation instruction, and execute adjustment of a focus in accordance with MF in response to a specific operation being performed while an operation for the shooting preparation instruction continues.

In order to solve the aforementioned problems, the present invention provides a non-transitory computer-readable storage medium storing a program for causing a computer to function as a setting unit and a control unit of an image capture control apparatus, comprising a detector configured to detect a more detailed part of a specific object from an image, wherein the specific object is a part of the image, wherein the setting unit configured to set whether it is possible to designate the detailed part detected by the detector as an auto focus (AF) target, and the control unit configured to control so as to if a predetermined condition is satisfied and there is a setting that makes it impossible for the setting unit to designate the detailed part as an AF target, perform AF in accordance with a shooting preparation instruction, and not execute adjustment of a focus in accordance with manual focus (MF) even if a specific operation is performed while an operation for the shooting preparation instruction continues, and if a predetermined condition is satisfied and there is a setting that makes it possible for the setting unit to designate the detailed part as an AF target, perform AF in accordance with a shooting preparation instruction, and execute adjustment of a focus in accordance with MF in response to a specific operation being performed while an operation for the shooting preparation instruction continues.

According to the present invention, it is possible to smoothly perform an operation for finely adjusting a focus at a more detailed part of a specific object.

Further features of the present invention will become apparent from the following description of exemplary embodiments (with reference to the attached drawings).

BRIEF DESCRIPTION OF THE DRAWINGS

FIG. 6 is a flowchart that illustrates the object designation process of FIG. 3.

FIGS. 8A through 8D are views that exemplify image capture condition setting screens.

DESCRIPTION OF THE EMBODIMENTS

Hereinafter, embodiments of the present invention will be described in detail with reference to the appended drawings.
<Apparatus Configuration>

The functions and external appearance of a digital camera as an image capture control apparatus according to the present embodiment will be described with reference to FIGS. 1 and 2.

Figure 1:
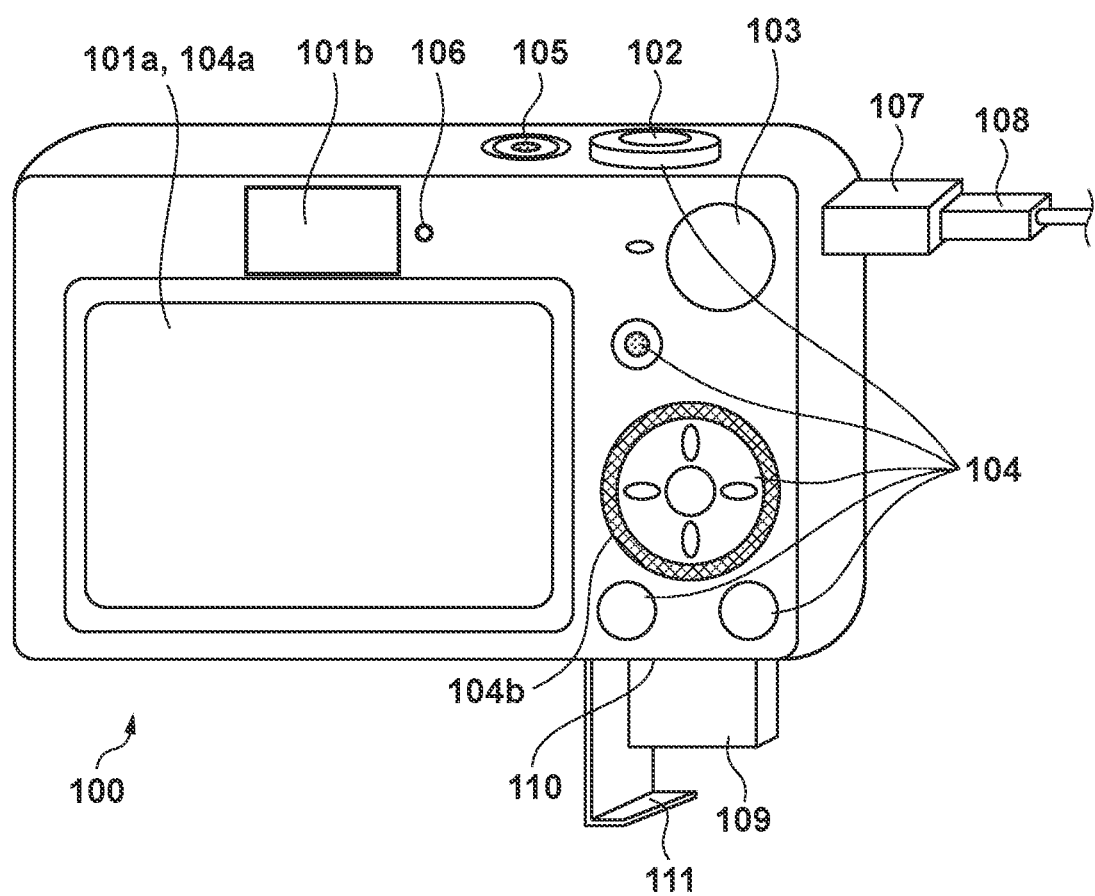
FIG. 1 is an external view of a rear surface of a digital camera according to a present embodiment.

In FIG. 1, which illustrates the external appearance of a rear surface of a digital camera 100 according to the present embodiment, a display unit 101 is constituted by a liquid crystal display panel (LCD) that displays images, various types of information, and the like. The display unit 101 includes a rear surface display panel 101a, which is a display unit arranged outside of a viewfinder, and an electronic viewfinder ("EVF" hereinafter) 101b, which is a display unit within the viewfinder. With the EVF 101b, a user can monitor (can view) an image capturing screen through a look-through type (eye proximity type) eye proximity unit of a viewfinder. A shutter button 102 is an operation unit for making a shooting instruction. A mode switching button 103 is an operation unit for switching among various types of modes. A connector 107 is an interface for connecting a connection cable 108 that connects an external device such as a personal computer or a printer to the digital camera 100. An operation unit 104 is constituted by operation members such as various types of switches and buttons and a touch panel which accept various types of operations from the user. A controller wheel 104b is an electronic dial, included in the operation unit 104, that can be rotated. A power switch 105 is an operation unit for switching the power source on and off. An eye proximity detection unit 106 detects an approach of some kind of object to the eyepiece part of the finder incorporating the EVF 101b by using an infrared proximity sensor or the like. A recording medium 109 is a recording medium such as a memory card, a hard disk, or the like. A recording medium slot 110 is a slot for holding the recording medium 109. The recording medium 109 held in the recording medium slot 110 can communicate with the digital camera 100. A cover 111 is a cover for the recording medium slot 110. FIG. 1 illustrates a state in which the cover 111 is open, and the recording medium 109 has been partially removed and is exposed from the recording medium slot 110.

Figure 2:
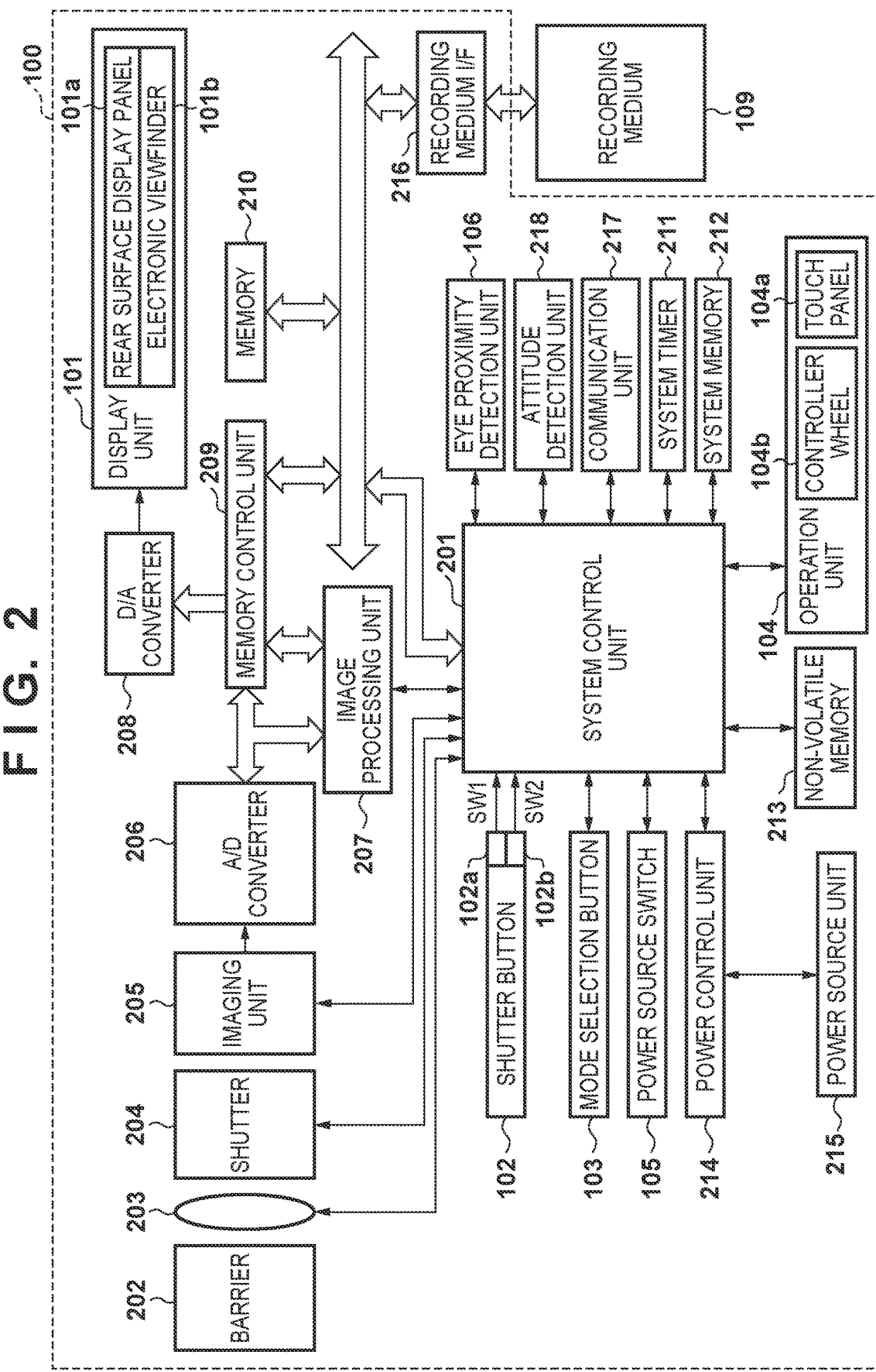
FIG. 2 is a block diagram illustrating the configuration of the digital camera according to the present embodiment.

In FIG. 2, which illustrates the internal configuration of the digital camera 100 according to the present embodiment, a shooting lens 203 is a lens group including a zoom lens and a focus lens. A shutter 204 has an aperture function. An imaging unit 205 is an image sensor constituted by a CCD, a CMOS, or the like that converts an optical image of an object into an electrical signal. An A/D converter 206 converts analog signals into digital signals. The A/D converter 206 is used to convert analog signals output from the imaging unit 205 into digital signals. A barrier 202 prevents an imaging system of the digital camera 100 including the shooting lens 203, the shutter 204, and the imaging unit 205 from being soiled or damaged by covering the imaging system including the shooting lens 203.

An image processing unit 207 carries out predetermined pixel interpolation, resizing processing such as reduction, color conversion processing, and the like on data from the A/D converter 206 or data from a memory control unit 209. The image processing unit 207 also performs predetermined computational processing using imaged image data, and a system control unit 201 performs exposure control and range-finding control based on results obtained from these computations. A TTL (through-the-lens) AF (autofocus) process, an AE (automatic exposure) process, and an EF (flash pre-emission) process are implemented as a result. The image processing unit 207 also performs predetermined computational processes using the imaged image data, performing a TTL AWB (auto white balance) process on the basis of the obtained computation results.

Data output from the A/D converter 206 is written directly into memory 210 through the image processing unit 207 and the memory control unit 209, or through the memory control unit 209. The memory 210 stores the image data obtained by the imaging unit 205 and converted into digital data by the A/D converter 206, image data for display in the display unit 101, and the like. The memory 210 has a storage capacity sufficient to store a predetermined number of still images, a predetermined time's worth of moving images and audio, and so on.

The memory 210 also functions as image display memory (video memory). A D/A converter 208 converts data for image display, stored in the memory 210, into an analog signal and supplies the analog signal to the display unit 101. Image data for display written into the memory 210 is thus displayed by the display unit 101 via the D/A converter 208 in this manner. The display unit 101 carries out a display in the display device, which is an LCD or the like, based on the analog signal from the D/A converter 208. A digital signal first subjected to A/D conversion by the A/D converter 206 and stored in the memory 210 is converted to an analog signal by the D/A converter 208, and is then sequentially transferred to and displayed in the display unit 101, thus realizing a live view image display.

Non-volatile memory 213 is electrically erasable/recordable memory, and EEPROM is used, for example. Operational constants, programs, and so on of the system control unit 201 are stored in the non-volatile memory 213. Here, "programs" refers to programs for executing the various flowcharts according to the present embodiment, which will be described later.

The system control unit 201 controls the entire digital camera 100. The respective processes according to the present embodiment, which will be mentioned later, are implemented by executing programs stored in the non-volatile memory 213 mentioned above. 212 indicates system memory, and RAM is used for the system memory. Operational constants and variables for the system control unit 201, programs read from the non-volatile memory 213, and so on are loaded into the system memory 212. The system control unit 201 also carries out display control by controlling the memory 210, the D/A converter 208, the display unit 101, and so on.

A system timer 211 is a time measurement unit that measures times used in various types of control, measures the time of an internal clock, and so on.

The mode switching button 103, a first shutter switch 102a, a second shutter switch 102b, and the operation unit 104 are operation means for inputting various types of operating instructions to the system control unit 201.

The mode switching button 103 is for switching an operating mode of the system control unit 201 to one of at least a playback mode for playing back an image, and a shooting mode for shooting a still image or a moving image. For the shooting mode, there is an auto mode, an auto scene discrimination mode, a manual mode, a per-scene shooting mode, a program AE mode, a custom mode, or the like. Configuration may be taken such that one of these modes included in the shooting mode can be directly switched to by the mode switching button 103, or another operation member is used to switch to one of these modes included in the shooting mode, after the shooting mode is first switched to by the mode switching button 103. The auto mode is a mode in which various types of camera parameters are automatically decided by a program incorporated into the digital camera 100, on the basis of a measured exposure value. The manual mode is a mode in which the user can freely change the various types of camera parameters. The per-scene shooting mode is a mode that is implemented by, for each shooting scene, combining a shutter speed, an aperture value, a flash light emission state, a sensitivity setting, a white balance (WB) setting, or the like which are suitable for the shooting scene. The program AE mode is a mode for, together with the brightness of an object, the digital camera 100 to automatically decide a combination of a shutter speed and an aperture value. The custom mode is a mode in which a user can perform shooting by invoking settings that have been registered in advance.

The first shutter switch 102a switches on partway through operation of the shutter button 102 provided in the digital camera 100, or in other words, when the button is half-pressed (a shooting preparation instruction), and produces a first shutter switch signal SW1. Shooting preparation processes, such as the AF process, the AE process, the AWB process, and the EF process, are started in response to the first shutter switch signal SW1.

The second shutter switch 102b turns on when the shutter button 102 is completely manipulated, or in other words, is fully pressed (a shooting instruction), and produces a second shutter switch signal SW2. The system control unit 201 commences a series of shooting processes, from reading out signals from the imaging unit 205 to writing image data into the recording medium 109, in response to the second shutter switch signal SW2.

Functions relevant for different scenes are assigned to the operation members of the operation unit 104, which then act as various types of function buttons, in accordance with operations for selecting various types of function icons displayed in the display unit 101. An end button, a return button, a next image button, a jump button, a sort button, an attribute change button, a menu button, and so on are examples of the function buttons. For example, a menu screen in which various types of settings can be made is displayed in the display unit 101 when a menu button is pressed. A user can make various types of settings intuitively using the menu screen displayed in the display unit 101, along with up, down, left, and right directional buttons, a set button, and so on.

The controller wheel 104b is an operation member, included in the operation units 104, that can be rotationally manipulated, and is used along with the directional buttons when specifying items to be selected and so on. When the controller wheel 104b is turned, an electrical pulse signal is generated in accordance with the amount of rotation, and the system control unit 201 controls each unit of the digital camera 100 based upon the pulse signal. The angle through which the controller wheel 104b has been turned and how many times it has been turned can be determined by the pulse signal. It should be noted that the controller wheel 104b can be any operation member so long as it is an operation member whose rotation can be detected. For example, it can be a dial operating member in which the controller wheel 104b itself is rotated to generate the pulse signal in accordance with a turning operation (a rotational operation) by the user. Further, it can be an operation member comprising a touch sensor (a so-called touch wheel) that detects an operation such as a rotating movement of the user's finger on the controller wheel 104b without the controller wheel 104b itself being rotated.

A power control unit 214 is constituted by a battery detection circuit, a DC-DC converter, switch circuits for switching the blocks that are energized, and so on, and detects whether or not a battery is attached, the type of the battery, the remaining battery power, and so on. The power control unit 214 also controls the DC-DC converter based on the detection results and instructions from the system control unit 201, and supplies a necessary voltage for a necessary period to the various units, including the recording medium 109.

A power source unit 215 is a primary battery such as an alkaline battery, a lithium battery, or the like, a secondary battery such as a NiCd battery, a NIMH battery, a lithium-ion battery, or the like, an AC adapter, or the like. A recording medium I/F 216 is an interface for the recording medium 109 such as a memory card, a hard disk, or the like. The recording medium 109 is a recording medium for recording shot images, such as a memory card or the like, and is constituted by a semiconductor memory, a magnetic disk, or the like.

A communication unit 217 communicatively connects to an external device using a wireless antenna, a hard-wire cable, or the like, and exchanges video, audio, and so on. The communication unit 217 can also connect to a wireless LAN (local area network), the Internet, and so on. The communication unit 217 can send image data captured by the imaging unit 205 (including live view images), image files recorded into the recording medium 109, and so on to the external device, and can receive image data, various other types of information, and so on from the external device.

An attitude detection unit 218 detects the attitude of the digital camera 100 relative to the gravitational direction. Whether an image captured by the imaging unit 205 was shot with the digital camera 100 held horizontally or shot with the digital camera 100 held vertically can be distinguished in accordance with the attitude detected by the attitude detection unit 218. The system control unit 201 can add information pertaining to the attitude detected by the attitude detection unit 218 to image data captured by the imaging unit 205, rotate and store the image data on the basis of that information, and so on. An accelerometer, a gyrosensor, or the like can be used as the attitude detection unit.

The eye proximity detection unit 106 detects whether an eye (an object) has approached (eye proximity) or has moved away (eye separation) with respect to the eye proximity unit of the viewfinder. The system control unit 201 switches the rear surface display panel 101a and the EVF 101b between displaying (a display state)/not displaying (a non-display state) in accordance with the state detected by the eye proximity detection unit 106. That is, the system control unit 201 sets a display destination as the EVF 101b when the eye proximity detection unit 106 detects the eye proximity and sets the display destination as the rear surface display panel 101a when the eye proximity is not detected.

A touch panel 104a capable of detecting a contact on the rear surface display panel 101a is included as one of the operation unit 104. The touch panel 104a and the rear surface display panel 101a can be configured as an integrated unit. For example, the touch panel 104a is configured having a light transmittance that does not interfere with the display of the rear surface display panel 101a, and is then attached to the top layer of the display surface of the rear surface display panel 101a. Input coordinates of the touch panel 104a are then associated with display coordinates on the rear surface display panel 101a. This makes it possible to configure a GUI (graphical user interface) in which the user seems to be capable of directly manipulating the screen displayed on the rear surface display panel 101a. In other words, a touch sensing surface of the touch panel 104a serves as the display surface of the rear surface display panel 101a. An in-cell touch panel display, in which the display element of the rear surface display panel 101a and an electrostatic capacitance-type touch detection (touch sensing) electrode are configured integrally without a separator interposed therebetween, may be used as well. The system control unit 201 can detect the following operations or states with respect to the touch panel 104a.

When a finger or pen that had not been touching the touch panel 104a newly touches the touch panel 104a. In other words, this is the start of a touch (called "touch-down" hereinafter).

When a finger or pen is touching the touch panel 104a (called "touch-on" hereinafter).

When a finger or pen is moved while touching the touch panel 104a (called "touch-move" hereinafter).

When a finger or pen that had been touching the touch panel 104a is removed. In other words, this is the end of a touch (called "touch-up" hereinafter).

When nothing is touching the touch panel 104a (called "touch-off" hereinafter).

When a touch-down is detected, a touch-on is detected at the same time. A touch-on normally continues to be detected after a touch-down as long as no touch-up is detected. A touch-move being detected is also a state in which a touch-on is detected. Even if a touch-on is detected, a touch-move is not detected as long as the touched position does not move. A touch-off occurs after a touch-up has been detected for all fingers or pens that had been touching.

These operations/states, positional coordinates on the touch panel 104a where the finger or pen had been touching, and so on are communicated to the system control unit 201 through an internal bus. The system control unit 201 determines what type of operation (touch operation) has been made on the touch panel 104a on the basis of the communicated information.

With respect to a touch-move, the movement direction of the finger or pen moving on the touch panel 104a can be determined on the basis of changes in the positional coordinates, for each of a vertical component and a horizontal component on the touch panel 104a. In addition, when a touch-up is performed after a certain touch-move after a touch-down on the touch panel 104a, it is assumed that a stroke has been drawn. An operation of quickly drawing a stroke is called a flick. A flick is an operation for quickly moving a finger for a certain distance while the finger is touching the touch panel 104a, and then directly releasing the finger, and in other words is an operation for quickly tracing the finger on the touch panel 104a so as to flick the finger. A flick can be determined to have been carried out if a touch-move of greater than or equal to a predetermined distance and at greater than or equal to a predetermined speed is detected and a touch-up is then directly detected. In addition, it is assumed that, if a touch-move of greater than or equal to the predetermined distance at less than the predetermined speed is detected, it is determined that a drag has been performed.

Furthermore, when a plurality of locations (two points, for example) are touched at the same time, and the touched positions are brought together, the touch operation is called a "pinch-in", whereas when the touched positions are moved apart, the touch operation is called a "pinch-out". Pinch-out and pinch-in are collectively referred to as pinch operations (or simply "pinching").

Any of a variety of types of touch panels, such as resistive film, electrostatic capacitance, surface acoustic wave, infrared, electromagnetic induction, image recognition, and optical sensor, may be used as the touch panel 104a. Depending on the type, a touch is detected when a contact is made with the touch panel, or a touch is detected when a finger or pen has approached the touch panel, and either of these types may be used.

The digital camera 100 of the present embodiment is capable of shooting using central single-point AF, face AF, or pupil AF. Central single-point AF performs AF with respect to one point at a center position in an image capture plane. Face AF performs AF with respect to a face in an image capture plane that is detected by a face detection function. Pupil AF performs AF with respect to a pupil included in a face inside an image capture plane that is detected by an organ (part) detecting function which is a type of a face detection function.

Description is given regarding the face detection function. The system control unit 201 functions as a detection unit that is capable of detecting a face and an organ (part) (such as an eye, a nose, a mouth, or an ear) of the face from an image. The system control unit 201 sends image data that is a target of a face detection to the image processing unit 207. Under control of the system control unit 201, the image processing unit 207 applies a horizontal band pass filter to the image data. In addition, under control of the system control unit 201, the image processing unit 207 applies a vertical band pass filter to the image data. By applying these horizontal and vertical band pass filters, an edge component is detected from the image data.

Subsequently, the system control unit 201 performs pattern matching with respect to the detected edge component to extract a candidate group of face organ (part)s such as eyes, nose, mouth, and ears. From an extracted eye candidate group, the system control unit 201 determines something that satisfies a condition set in advance (for example, a distance between two eyes, a slant, or the like) as an eye, to narrow down the eye candidate group. The system control unit 201 detects a face by associating the narrowed eye candidate group with other parts (organ (part)s such as nose, mouth, and ears) for forming a face that corresponds thereto, or by applying a non-face condition filter that is set in advance. The system control unit 201, in accordance with a face detection result, outputs a number of detected faces, and face information such as a position, size, orientation, and the position or size of organ (part)s (eyes, nose, mouth, ears) contained in each face, and then ends the process. At that time, the system control unit 201 stores feature amounts such as a number of faces in the system memory 212. A region once detected as a face will continue to be detected as a face for a predetermined time period (about one second) if conditions such as contrast, color, or size match. By this, it is possible to continue detecting this region as a face even if an organ (part) of a face ceases to be detected such as by an object temporarily facing away, closing their eyes, or the like.

The system control unit 201 determines an eye, which was extracted for a face detected by the aforementioned face detection function, as a detected eye (pupil), and outputs pupil information as a pupil detection result. The pupil information includes, for example, a position of an eye in an image, a position of the eye in the face, a size, or the like, and also includes a pupil region which is based on the position and size of the eye. Pupil detection is a type of organ (part) detection for detecting an element (a part) of a face.

As described above, it is possible to perform image analysis on image data which is subject to a live-view display or image data that is subject to a playback display, extract feature amounts of the image data, and detect specific object information such as a face or a pupil.

Note that it is possible to perform face AE, face FE, and face WB at the same time as face AF. Face AE is optimizing exposure of the entirety of a screen in accordance with the brightness of a detected face. Face FE is flash light control that is centered on a detected face. Face WB is optimizing the WB of the entirety of a screen in accordance with the color of the detected face.

Furthermore, the system control unit 201 can also use the image processing unit 207 to, in accordance with a condition for a color, contrast, a motion vector, or the like, detect something which is predicted to be a principal object (something other than the face or organ (part) of a person).

In addition, the digital camera 100 of the present embodiment can set, as a focusing operation mode for adjusting a focus at a time of shooting, one of an auto focus (hereinafter, AF) mode for automatically focusing on an object, and a manual focus (hereinafter, MF) mode for a user to perform a focus adjustment manually.

As an AF operating mode at a time of shooting, it is possible to set one AF mode from a plurality of AF modes in accordance with a user operation. An AF mode setting is performed based on a user operation in an AF mode setting screen which is displayed after a menu item for setting the AF mode is selected in a setting menu screen. A plurality of AF modes are prepared for each method of deciding a position at which to perform AF. In the present embodiment, it is assumed that it is possible to set either of a single-point AF mode and a tracking priority mode as the AF mode.

The single-point AF mode is an AF mode for setting an AF frame that indicates a focus adjustment position at the center of a capturing range or at a location designated by a user. In the single-point AF mode, the AF frame does not move even if there is change in the object, and AF is performed based on information (a contrast value or a defocus amount for phase difference AF) obtained from the position of the AF frame, irrespective of whether an object such as a face is being detected.

In the tracking priority mode, in a case where there is not a tracking designation from a user (a tracking standby state, a tracking released state), an object that the digital camera 100 automatically determines to be a primary object becomes an AF target (a focus adjustment position). If the face of a person is detected, a detected pupil or the face of the person is prioritized, set as the primary object, and becomes the AF target. If a person's face has not been detected, the digital camera 100 automatically determines the primary object in accordance with predetermined conditions, such as object movement, an object having a high contrast value, an object near the center, and so on, and sets that object as the target for AF. In addition, after a tracking designation from a user is made, the object designated in the LV image continues to be tracked, and the tracked object is set as the AF target, even if the position of the tracked object within the capturing range changes. For example, if a user has made a tracking designation for a face or a pupil of a person A (during tracking), the pupil or face of the person A continues to be tracked and is set as the AF target even if the person A moves on the live view image.

An object aside from a person can also be used as the tracking target (object tracking), so that even if the same object has moved, the object continues to be tracked in the LV image in accordance with conditions such as the color, contrast, shape, and so on of a position designated for tracking, and that object is targeted for AF. That is, the tracking priority mode is an AF mode in which a decision of an AF position in accordance with the performance of tracking is possible. Note that the AF mode is not limited to the single-point AF mode and the tracking mode. For example, an AF mode in which tracking is carried out within a limited region designated by the user ("zone AF") or the like may be used. The set AF mode is stored in the non-volatile memory 213, and is read out into the system memory 212 during the shooting mode process.

<Shooting mode process>

Next, with reference to FIG. 3 through FIG. 7, description is given regarding a shooting mode process in accordance with the digital camera 100 of the present embodiment.

Figure 3:
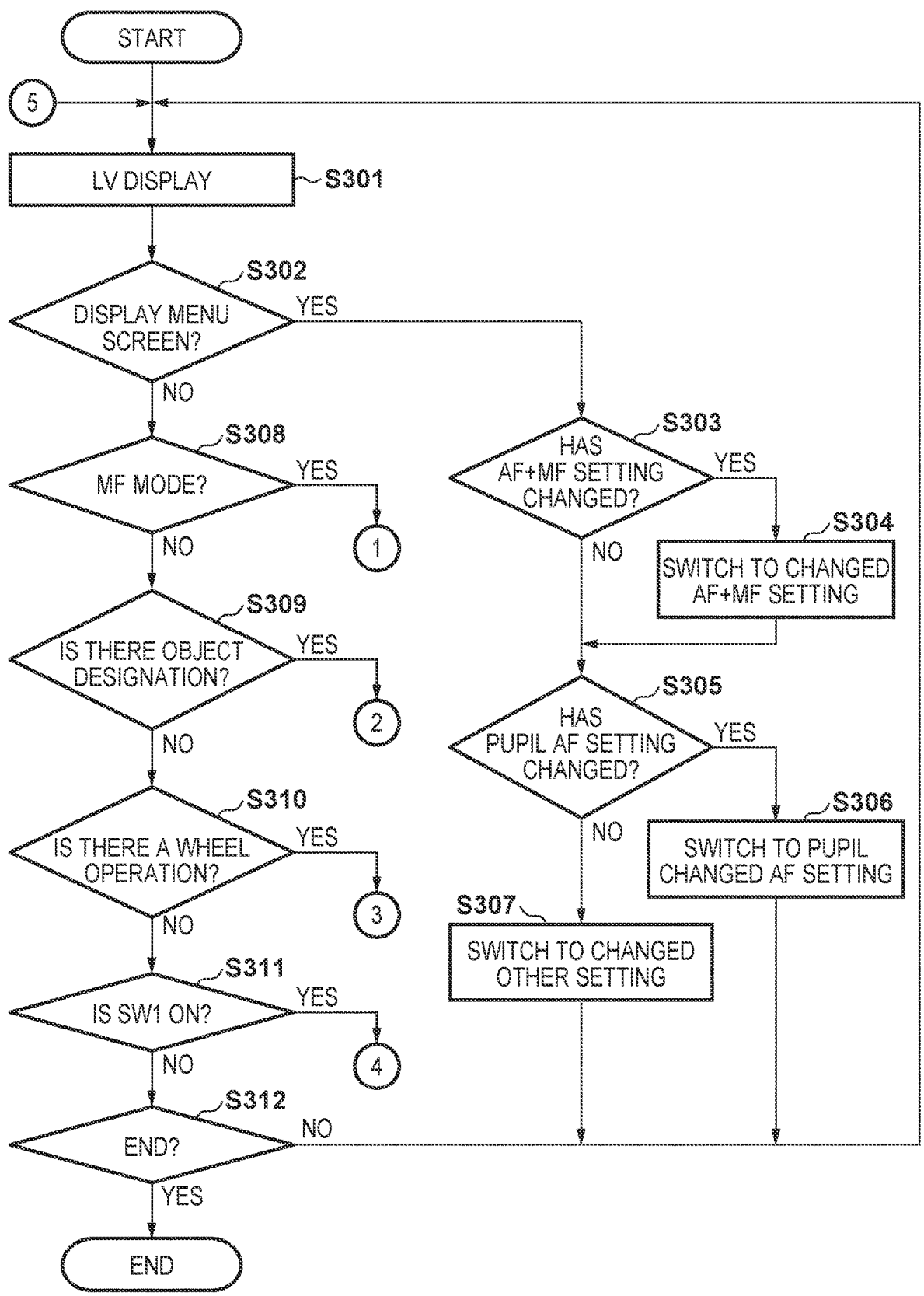
FIG. 3 is a flowchart illustrating a shooting mode process according to the present embodiment.

Note that the process of FIG. 3 is implemented by the system control unit 201 executing a program recorded in the non-volatile memory 213 that has been read into the system memory 212. When the digital camera 100 is activated in the shooting mode, the shooting mode process of FIG. 3 starts. Note that FIG. 3 illustrates a process for a case where the AF mode is set to the tracking priority mode. Description regarding processing for a case where the single-point AF mode is set is omitted.

In the tracking priority mode, a face and organ (part)s of the face are extracted from a live view image, and the detected face or a detected organ (part) becomes a candidate that is designated as an AF target (a tracking target) in accordance with a user operation (a touch operation in the present embodiment). In addition, a plurality of operating modes which have different AF targets that can be designated in accordance with a touch operation are prepared, and a user can set any operating mode on a menu screen. Below, description is given for an example of a digital camera for which an organ (part) of a face detected from an image is assumed to be an eye (a pupil), and for which it is possible to set "pupil AF on" which enables a face and a pupil to be designated as an AF target, and "pupil AF off" which enables a face to be designated as an AF target (and does not enable a pupil to be designated), as the plurality of operating modes which have different AF targets that can be designated in accordance with a touch operation.

In step S301, the system control unit 201, after performing initialization process for the shooting mode, displays an image obtained by the imaging unit 205 as a live view (hereinafter may be abbreviated as LV) on the display unit 101. A display destination of the live view image is the rear surface display panel 101a if display destination switching is set to "automatic" and eye proximity is not being detected by the eye proximity detection unit 106, and is the EVF 101b if eye proximity is being detected. In addition, the display destination is the rear surface display panel 101a if display destination switching is "manual" and the display destination is set to the rear surface display panel 101a, and is the EVF 101b if the display destination is set to the EVF 101b. In addition, the initialization process for the shooting mode is process such as reading parameters including a flag, a control variable, or the like, setting values, and a setting mode, from the non-volatile memory 213. In addition, the state of the recording medium 109 is confirmed, and if there is an abnormality or the like, a warning or the like is overlaid on a live view and displayed.

In step S302, the system control unit 201 determines whether a menu button included in the operation unit 104 is pressed, and if it is determined that a menu button has been pressed the process advances to step S303, and otherwise the process advances to step S308.

In step S303, the system control unit 201 displays a menu screen on the display unit 101, and determines whether an AF+MF setting has changed. The menu screen includes an AF+MF setting item and a pupil AF setting item, and when a respective setting item is selected by a user, a setting screen relating to the selected setting item is displayed on the display unit 101. In an AF+MF setting screen and a pupil AF setting screen, the choices "on (possible)" and "off (impossible)" are displayed as setting candidates, and a user can select one to perform a setting for AF+MF or pupil AF. If the AF+MF setting was changed in step S303, the process proceeds to step S304, and the system control unit 201 stores the setting value ("on (possible)" or "off (impossible)" for AF+MF) changed in step S303 in the non-volatile memory 213, and then sets the AF mode. In addition, if the AF+MF setting has not been changed in step S303, the process proceeds to step S305, and the system control unit 201 determines whether the pupil AF setting has been changed. If the pupil AF setting was changed in step S305, the process proceeds to step S306, and the system control unit 201 stores the setting value ("on (possible)" or "off (impossible)" for pupil AF) changed in step S305 in the non-volatile memory 213, and then sets the AF mode. In addition, if a setting item other than for pupil AF has been changed in step S305, the process proceeds to step S307, and similar process is performed for the item set in step S305.

In step S308, the system control unit 201 determines whether there has been an operation for switching the focusing operation mode to the MF mode, and if there has been an operation for switching to the MF mode, the process proceeds to step S401 of FIG. 4 which is described later, and otherwise the process proceeds to step S309. Even if there is not an operation for switching to the MF mode, if a setting immediately prior to activation of the digital camera 100 is the MF mode and the digital camera 100 activated in the MF mode (in other words, if the MF mode is currently set), the process proceeds to step S401 of FIG. 4.

In step S309, the system control unit 201 determines whether there has been an object designation operation, and if there has been an object designation operation the process proceeds to step S601 of FIG. 6, and otherwise the process proceeds to step S310.

Figure 7:
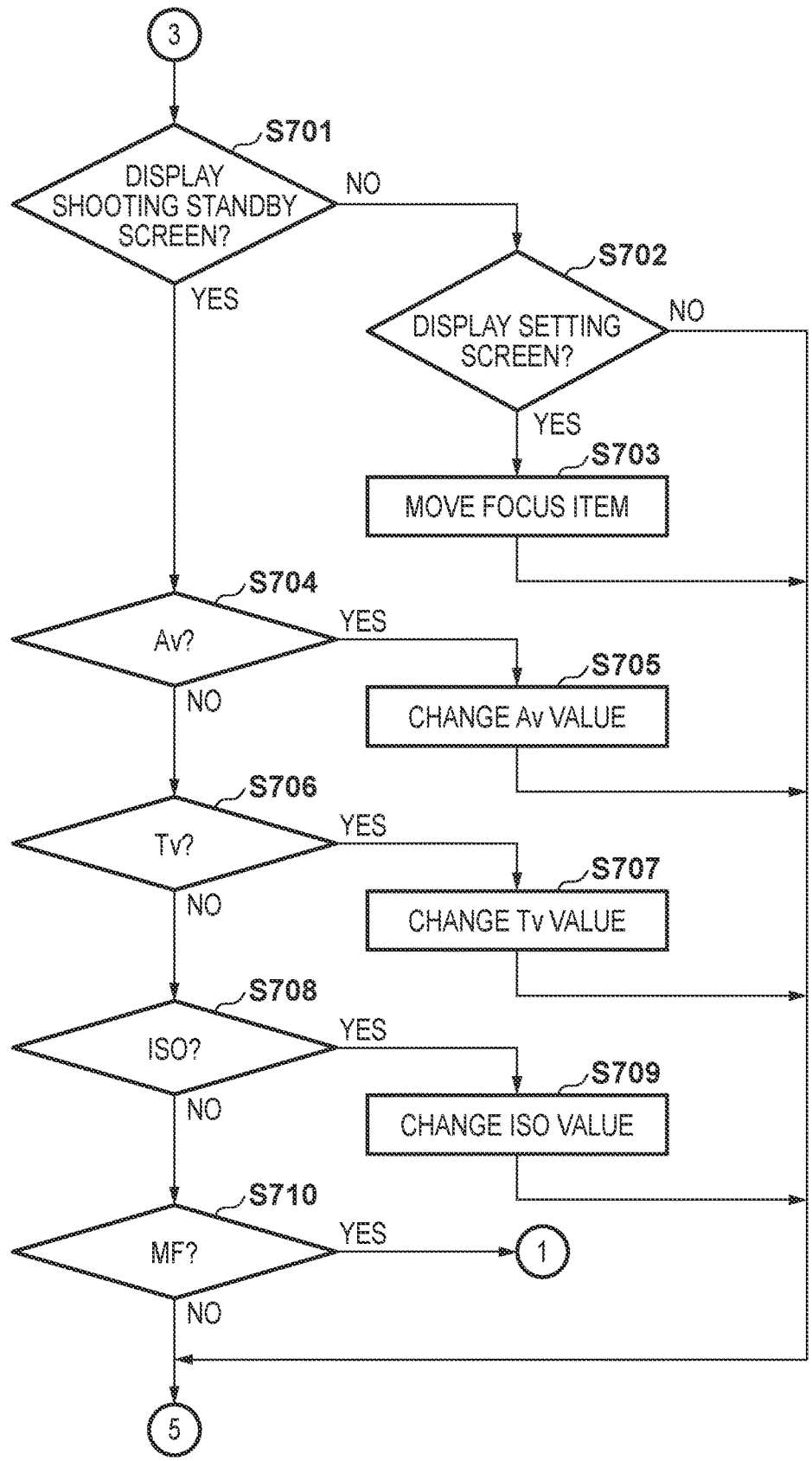
FIG. 7 is a flowchart illustrating a wheel operation process of FIG. 3.

In step S310, the system control unit 201 determines whether there has been a rotational operation of the controller wheel 104b, and if there has been a rotational operation of the controller wheel 104b, the process proceeds to step S701 of FIG. 7, and otherwise the process proceeds to step S311.

Figure 9:
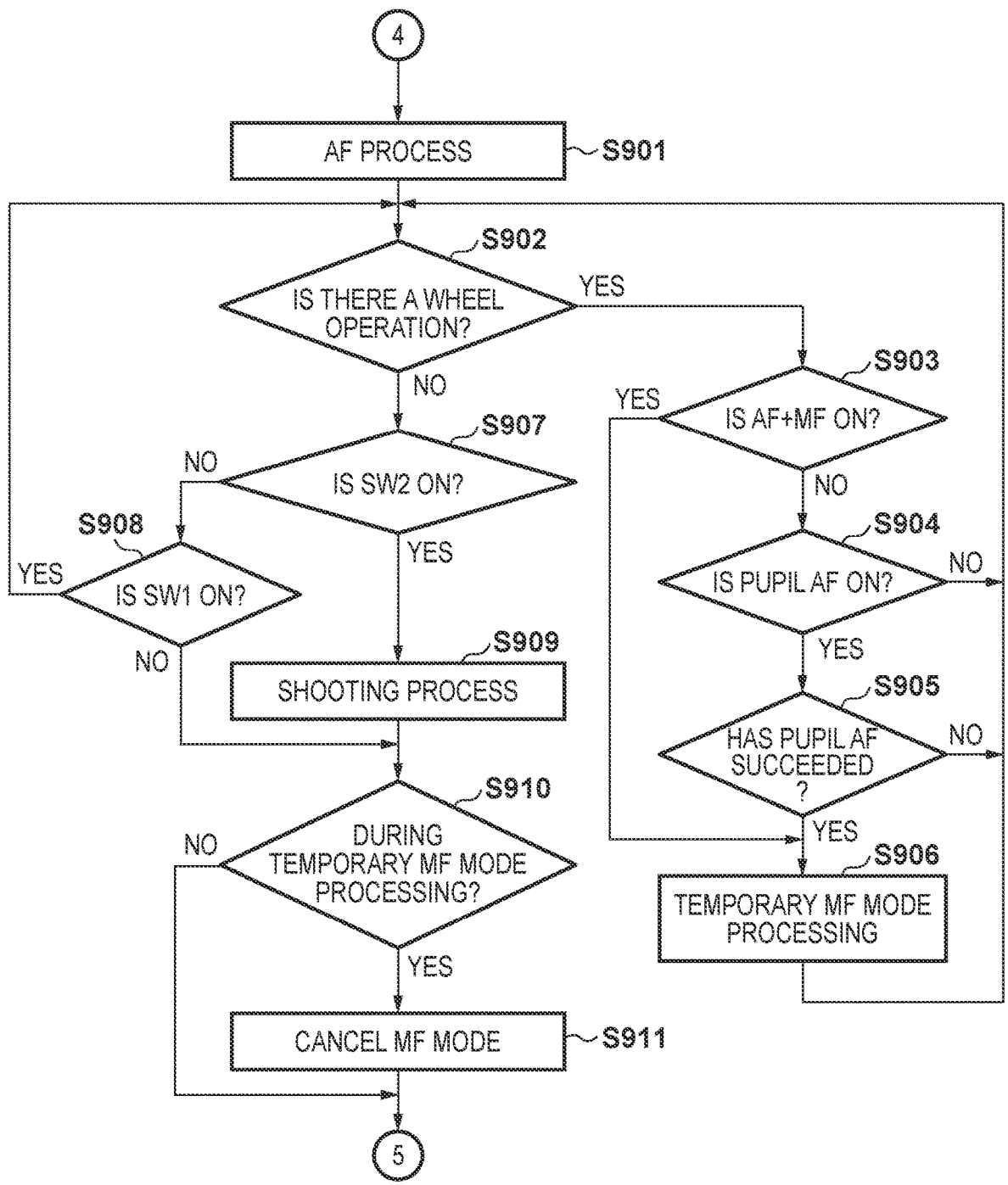
FIG. 9 is a flowchart that illustrates a shooting process of FIG. 3.

In step S311, the system control unit 201 determines whether there has been a half-press operation of the shutter button 102 in accordance with whether there has been an input of the first shutter switch signal SW1, and if there has been a half-press operation, the process proceeds to step S901 of FIG. 9, and otherwise the process proceeds to step S312.

In step S312, the system control unit 201 determines whether there has been an operation to end the shooting mode process such as a power off operation or an operation to transition to the playback mode, and if there has been an end operation the process ends, and otherwise the process returns to step S301 and repeats.

<MF Mode Process>

Next, using FIG. 4 and FIGS. 5A to 5D, description is given for process when an operation for switching to the MF mode has been pressed in step S308 of FIG. 3.

Figure 5A:
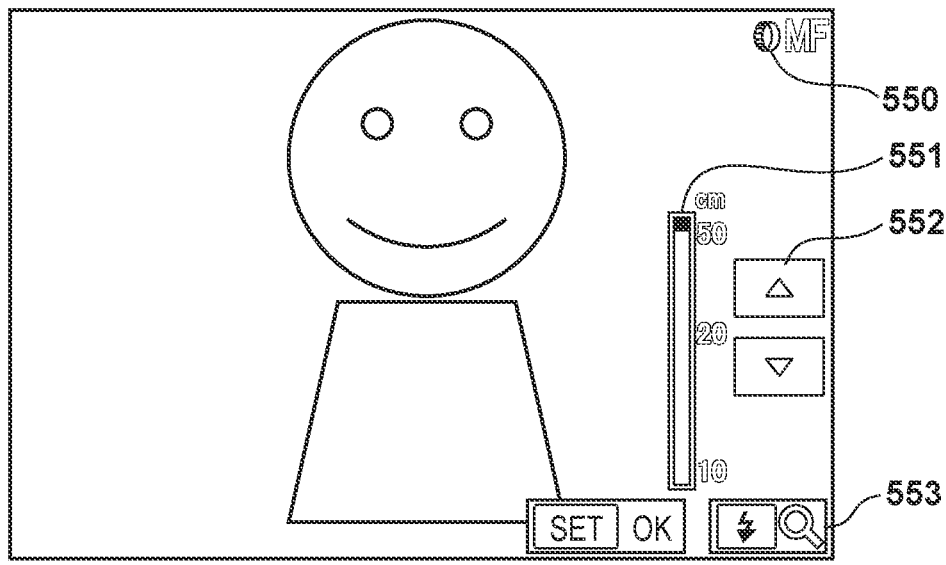
FIGS. 5A to 5C are views that exemplify MF setting screens.
Figure 5B:
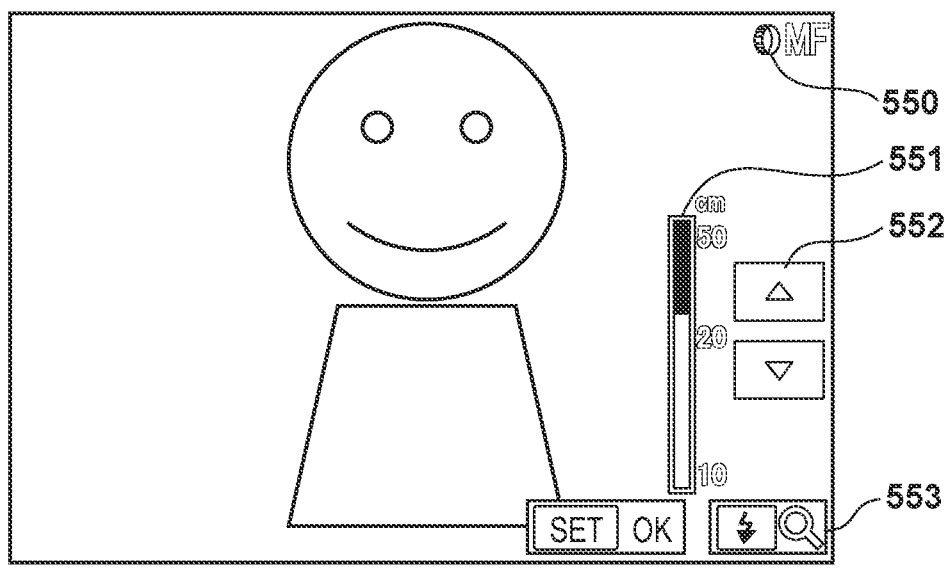
Figure 5C:
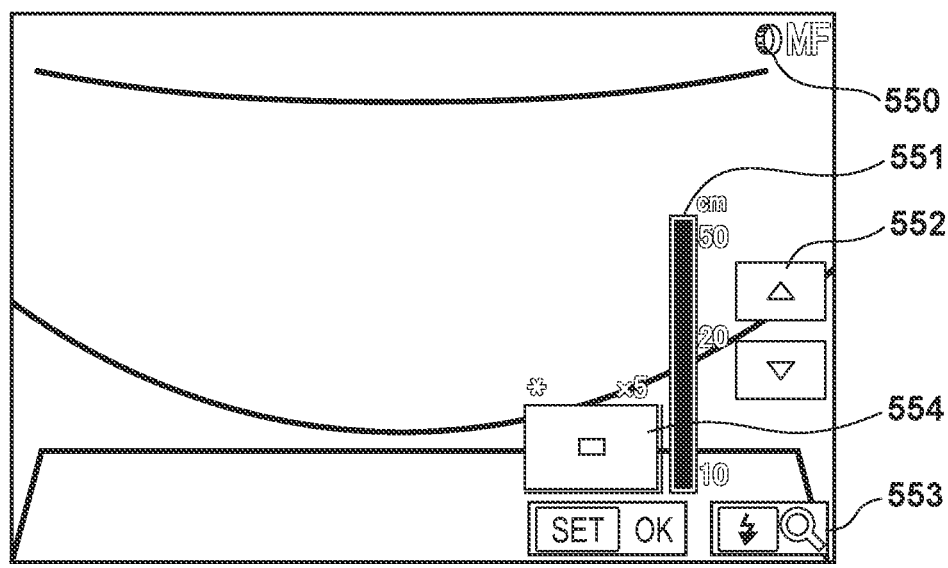

Upon determining that the MF mode has been switched to in step S308, the system control unit 201 displays an MF setting screen on the display unit 101 in step S401. FIGS. 5A to 5C exemplify MF setting screens. In FIGS. 5A to 5C, an indicator 551 indicates a distance where there is focus. With the distance indicated by the indicator 551 as a guide, a user can finely adjust the focus. In the present embodiment, it is possible to change the distance by a rotational operation of the controller wheel 104b, pressing the up and down buttons (the up button and the down button out of the up, down, left, and right directional buttons included in the operation unit 104), or a touch operation with respect to a touch button (a touch item displayed on the display unit 101) as a GUI element. An icon 550 is a display item that indicates to a user that it is possible to change the distance by the controller wheel 104b.

In step S402, the system control unit 201 determines whether the controller wheel 104b has been operated, and if the controller wheel 104 has been operated the process proceeds to step S403, and otherwise the process proceeds to step S406.

In step S403, the system control unit 201 determines the rotation direction of the controller wheel 104b, and upon determining that it rotated in a clockwise direction, the process proceeds to step S404, and the focus distance is changed toward the infinity end. With an operation in accordance with the controller wheel 104b, movement of the focus distance is fine motion so that a user can make fine adjustments. In addition, when the system control unit 201 determines in step S403 that the controller wheel 104b rotated in a counterclockwise direction, the process proceeds to step S405, and the focus distance is changed toward a close end. In this case as well, movement of the focus distance is fine motion similarly to in step S404.

In step S406, the system control unit 201 determines whether an operation of the up or down buttons, and if it is determined that there has been an operation of the up or down buttons the process proceeds to step S407, and otherwise the process proceeds to step S410.

In step S407, the system control unit 201 determines whether the up button has been operated, and if it is determined that the up button has been operated, the process proceeds to step S408, and the system control unit 201 moves the focus distance toward the infinity end. A focus movement speed is motion that is coarser than in the case where the controller wheel 104b is operated in step S403. In other words, the focus distance moved by one press of the up or down buttons is longer than the focus distance moved for one click of the controller wheel 104b. In addition, configuration may be taken to accelerate the focus movement speed if the up button continues to be pressed. By changing the focus movement speed by the controller wheel 104b or the up and down buttons in this way, a user can finely adjust the focus by a method according with the situation. In addition, when the system control unit 201 determines in step S407 that there has been an operation of the downward button, the process proceeds to step S409, and the focus distance moves toward a close end. In this case as well, the focus movement speed is coarse motion similarly to in step S408. In addition, in a case where a touch button is operated, there is an operation similar to that in a case where the up or down buttons are operated.

In step S410, the system control unit 201 determines whether an LV enlargement button included in the operation unit 104 has been operated, and if it is determined that the LV enlargement button has been operated the process advances to step S411, and otherwise the process advances to step S412. This operation differs to an operation for instructing an optical zoom with respect to a zoom lever, and is an operation for digitally enlarging a part of the live view image that is being captured.

In step S411, the system control unit 201 enlarges and displays the live view in accordance with an enlargement factor instructed in accordance with the operation of the LV enlargement button in step S410. FIG. 5C illustrates an example of an LV enlarged display. An enlargement position guide 554 indicates which part out of the whole image the enlarged location is. An initial position of the enlarging position is the center, and it can be moved to a desired location. In addition, by operating a button indicated by an icon 553, it is possible to change the enlargement factor. In addition, by setting the enlargement factor in advance from a menu, it is possible to perform an enlarged display of the live view image in accordance with a predefined enlargement factor when the MF setting screen is displayed. By this, a user can finely adjust the focus while confirming an image capturing state of the specific object in more detail.

In step S412, the system control unit 201 determines whether there has been an operation to end the MF setting screen, and if there has been an end operation the process proceeds to step S413, and otherwise the process returns to step S402 and repeats.

Figure 5D:
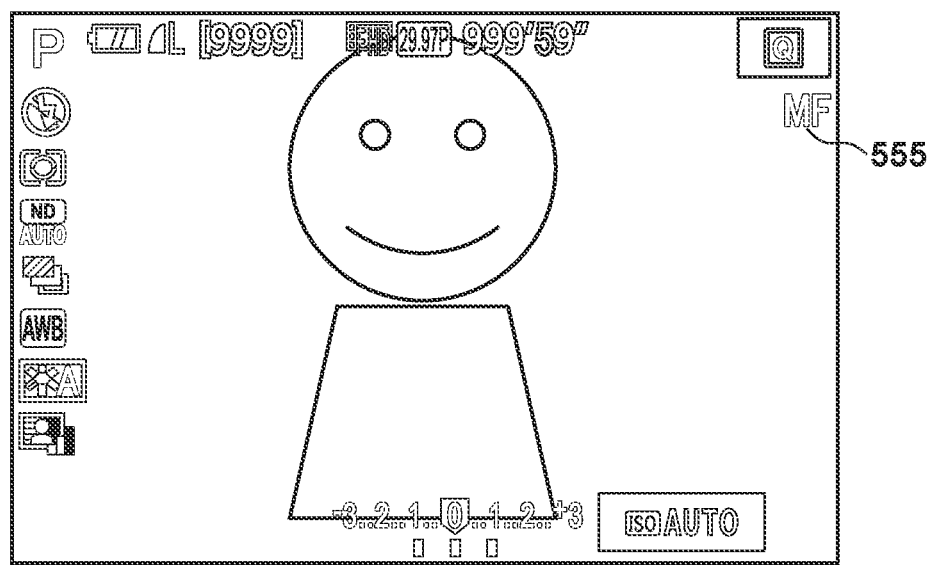
FIG. 5D is a view that exemplifies an MF standby screen.

In step S413, the system control unit 201 switches the display unit 101 from the MF setting screen to the MF standby screen, and the process returns to step S301. FIG. 5D exemplifies an MF standby screen. In the MF standby screen, it is not possible to change the focus, but an MF icon 555 indicating being in an MF state is displayed on the display unit 101.

<Object Designation Process>

Next, using FIG. 6, description is given for a process when the object designation operation is performed in step S309 of FIG. 3.

In the present embodiment, an object designation operation is an operation where a user touches the object that is displayed on the display unit 101. In step S309, when a touch operation (position designation operation) with respect to the touch panel 104a is detected, the process transitions to FIG. 6.

In FIG. 6, process for setting a tracking target is performed based on whether pupil AF is on or off, and the position designated on the LV screen by the touch operation. Note that the position designation operation in accordance with the touch operation detected by the system control unit 201 is a touch-down if the display destination is the rear surface display panel 101a, and is a touch-up if the display destination is the EVF 101b. Because a user cannot visually observe the touched position on the touch panel if the EVF 101b is the display destination, it becomes easier to confirm the position of a target by making the operation for confirming the touched position be a touch-up after a touch-down.

In step S601, the system control unit 201 determines whether the pupil AF setting is on (whether pupil AF is on or whether pupil AF is off), and if the pupil AF setting is on, the process proceeds to step S602, and otherwise the process proceeds to step S605.

In step S602, the system control unit 201 determines whether a designated position (hereinafter referred to as the position of the touch operation), for when a pupil is detected from the live view image and a touch operation is detected, is the position of the detected pupil (is inside a pupil region). When the system control unit 201 determines that the position of the touch operation is inside the pupil region, the process proceeds to step S603, and otherwise the process proceeds to step S605. Note that, in the case where pupil AF is on in step S602, it is possible to distinguish and designate a pupil of a right side and a pupil of a left side for the specific object. Note that, if the display destination is the rear surface display panel 101a, in the case where a touch-down is performed inside a region corresponding to a detected pupil in the live view being displayed on the rear surface display panel 101a, it will be determined that the position of the touch operation is within the region of the detected pupil. In addition, if the display destination is the EVF 101b, a cursor indicating a designated position moves, in accordance with a touch-move, on the live view image which is displayed on the EVF 101b, and when the cursor is subject to a touch-up, the position of the cursor is set to the position of the touch operation. Accordingly, when a touch-up is performed in a state where the cursor has been moved to inside a region corresponding to a detected pupil of the live view image displayed on the EVF 101b, it is determined that the position of the touch operation is inside the detected pupil region.

In step S603, the system control unit 201 determines whether the designated position that was determined in step S602 is within a selection region of a pupil on the right side seen from the user (the left eye of the specific object), with respect to the object in the live view image. In the case of a pupil on the right side, the system control unit 201 advances the process to step S604, and otherwise, in other words, when the designated position determined in step S602 is within a selection region for a pupil on the left side seen from the user (the right eye of the specific object) with respect to the object in the live view, the process proceeds to step S607.

In step S604, the system control unit 201 tracks, as a tracking target, the pupil on the right side of the face (the left eye of the detected face) detected at the designated position determined in step S602.

In step S607, the system control unit 201 tracks, as a tracking target, the pupil on the left side of the face (the right eye of the detected face) detected at the designated position determined in step S602.

In contrast, if the designated position is not a pupil region in step S602, in step S605, the system control unit 201 determines whether the position of the touch operation is a position of a detected face (within a face region), and if it is a position of a face, the process proceeds to step S608, and otherwise the process proceeds to step S606.

In step S608, the system control unit 201 tracks the face detected at the position of the touch operation as a tracking target.

In step S606, the system control unit 201 determines whether the position where the touch operation was performed is the position of a predetermined cancel touch button, and if it is the position of the cancel touch button, the process proceeds to step S609, and otherwise the process proceeds to step S610.

In step S609, the system control unit 201 executes object tracking which sets the object at the position of the touch operation as a tracking target. That is, with a condition such as the color, contrast, or shape of the object at the designated position in the live view image, the same object is set as an AF target that continues to be tracked even if it moves in the live view image.

In step S610, the system control unit 201 cancels the tracking state, and transitions to a tracking standby state.

<Wheel Operation Process>

Next, using FIG. 7 and FIGS. 8A through 8D, description is given for a process in the case where an operation of the controller wheel 104b is detected in step S310 of FIG. 3.

In a shooting standby state before a half-press operation of the shutter switch 102, the user can perform a rotational operation of the controller wheel 104b to make a setting regarding an image capture condition, and can set in advance a setting item that they wish to change through a menu screen or the like.

In step S701, the system control unit 201 determines whether the shooting standby screen is being displayed, and if the shooting standby screen is being displayed, the process proceeds to step S704, and otherwise the process proceeds to step S702.

Figure 8A:
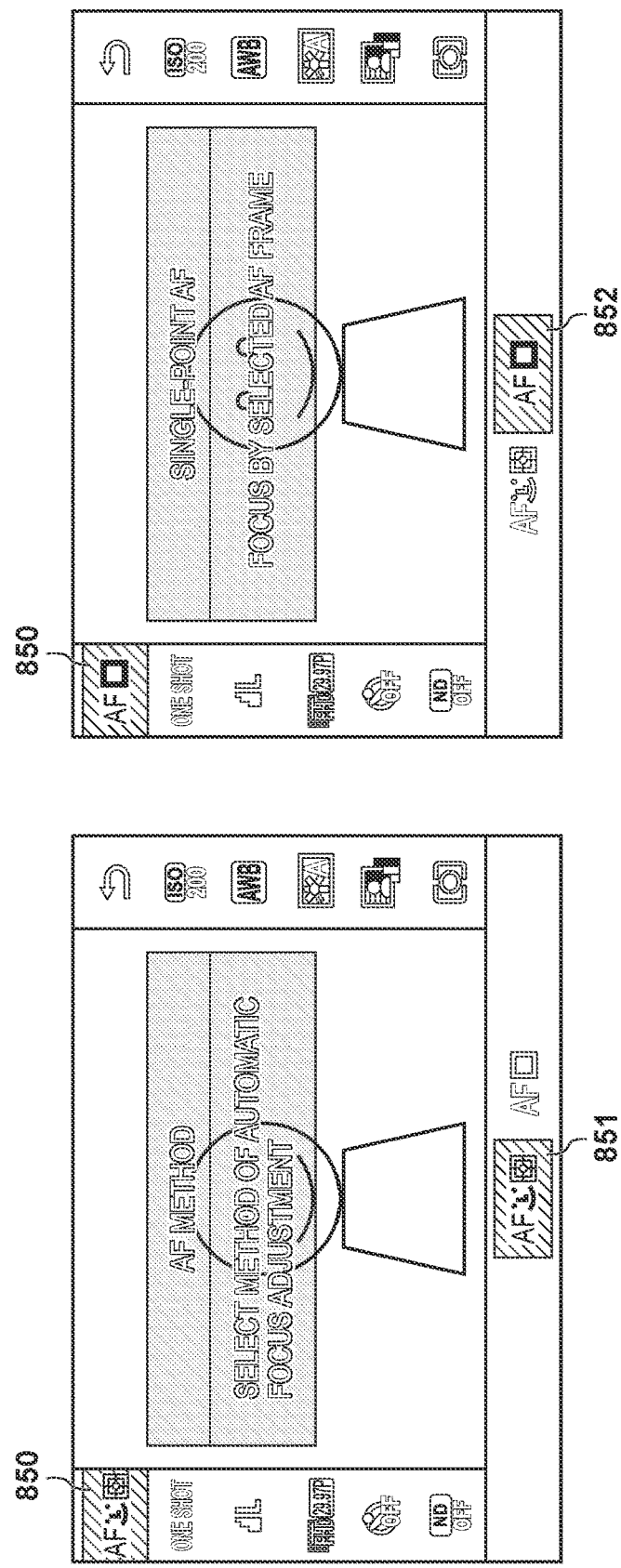

In step S702, the system control unit 201 determines whether a setting screen is being displayed, and if a setting screen is being displayed the process proceeds to step S703, and a setting item to which focus is given is moved. FIG. 8A exemplifies an image capture condition setting screen. FIG. 8A illustrates a state where focus is given to a face priority AF 851 as an AF method 850. When a rotational operation of the controller wheel 104b is performed in this state, a change is made to a state where focus is given to a single-point AF 852 as the AF method, and the AF method is changed.

In step S704, the system control unit 201 determines a function allocated to the controller wheel 104b, and if an Av value change function is allocated, the process proceeds to step S705, and otherwise the process proceeds to step S706.

In step S705, the system control unit 201 changes an Av value setting in accordance with the rotational operation of the controller wheel 104b, and stores a changed setting value in the non-volatile memory 213. FIG. 8B exemplifies a screen in which an Av value setting is changed. In FIG. 8B, similarly to the MF setting screen, a wheel icon 853 is displayed next to an Av value, and by that the user is explicitly notified that the Av value setting can be changed by rotating the controller wheel 104b. When the controller wheel 104b is actually rotated, a setting change screen is displayed as with reference numeral 854.

In step S706, it is determined whether the function allocated to the controller wheel 104b is a Tv value change function, and when the Tv value change function is allocated the process proceeds to step S707, and otherwise the process proceeds to step S708.

In step S707, the system control unit 201 changes a Tv value setting in accordance with the rotational operation of the controller wheel 104b, and stores a changed setting value in the non-volatile memory 213. FIG. 8C exemplifies a screen in which a Tv value setting is changed. In FIG. 8C, similarly to in FIG. 8B, a wheel icon 855 is displayed next to a Tv value, and by that the user is explicitly notified that the Tv value can be changed by rotating the controller wheel 104b. When the controller wheel 104b is actually rotated, a setting change screen is displayed as with reference numeral 856.

In step S708, the system control unit 201 determines whether the function allocated to the controller wheel 104b is an ISO value change function, and if the ISO value change function is allocated the process proceeds to step S709, and otherwise the process proceeds to step S710.

In step S709, the system control unit 201 changes an ISO value setting in accordance with the rotational operation of the controller wheel 104b, and stores a changed setting value in the non-volatile memory 213. FIG. 8D exemplifies a screen in which an ISO value setting is changed. In FIG. 8D, similarly to in FIG. 8B, a wheel icon 857 is displayed next to an ISO value, and by that the user is explicitly notified that the ISO value can be changed by rotating the controller wheel 104b. When the controller wheel 104b is actually rotated, a setting change screen is displayed as with reference numeral 858.

Figure 4:
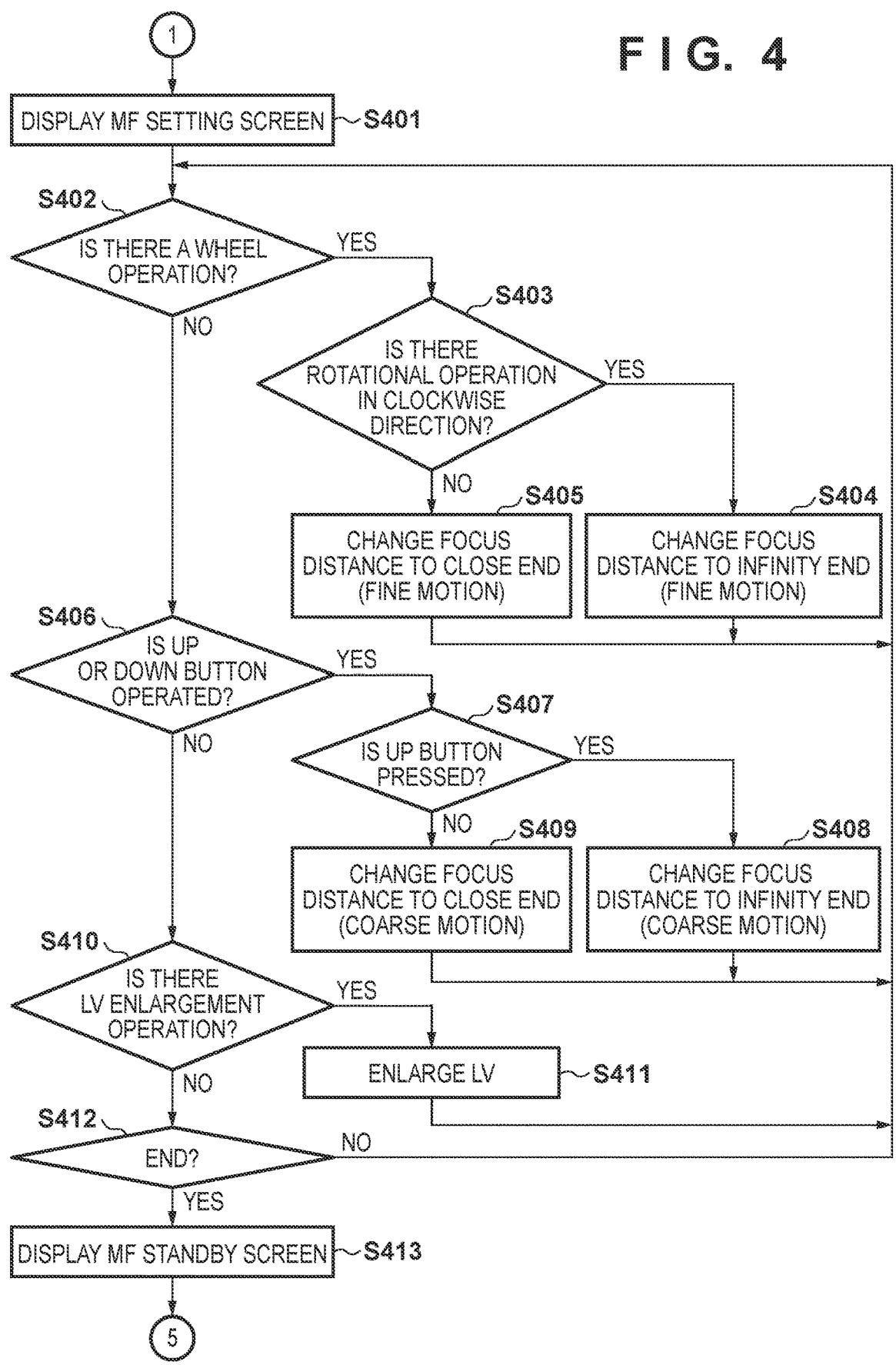
FIG. 4 is a flowchart illustrating the MF mode process of FIG. 3.

In step S710, the system control unit 201 determines whether the function allocated to the controller wheel 104b is an MF change function, and if the MF change function is allocated the process proceeds to step S401 of FIG. 4, and otherwise the process proceeds to step S301 of FIG. 3.

<Shooting Process>

Next, using FIG. 9 and FIGS. 10A to 10C, description is given for a process in the case where a half-press operation of the shutter button 102 in step S311 of FIG. 3.

FIG. 9 is a flowchart that illustrates a process for a case where the shutter button 102 is subject to a half-press operation in in step S311 of FIG. 3.

In step S901, the system control unit 201 starts an AF process, and in step S902, the system control unit 201 determines whether an operation of the controller wheel 104b (a focus adjustment operation) has been performed. If there has been a focus adjustment operation, the system control unit 201 advances the process to step S903, and otherwise advances the process to step S907.

In step S903, the system control unit 201 determines whether AF+MF is on, and if it is determined that AF+MF is on, the system control unit 201 accepts a focus adjustment operation regardless of a pupil AF setting or a focused object, and, in step S906, transitions to temporary MF mode process to set a state where the MF mode process described by FIG. 4 and FIGS. 5A to 5D is temporarily possible.

Because the temporary MF mode process is primarily intended for fine adjustments after AF focusing in accordance with a half-press of the shutter button 102, the temporary MF mode process is canceled if the first shutter switch signal SW1 is turned off or the second shutter switch signal SW2 is turned on.

In addition, if it is determined in step S903 that AF+MF is off, the process proceeds to step S904, and the system control unit 201 determines whether pupil AF is on. If it is determined that pupil AF is on the process proceeds to step S905, and otherwise the process returns to step S902 (a focus adjustment operation is ignored).

Figure 10A:
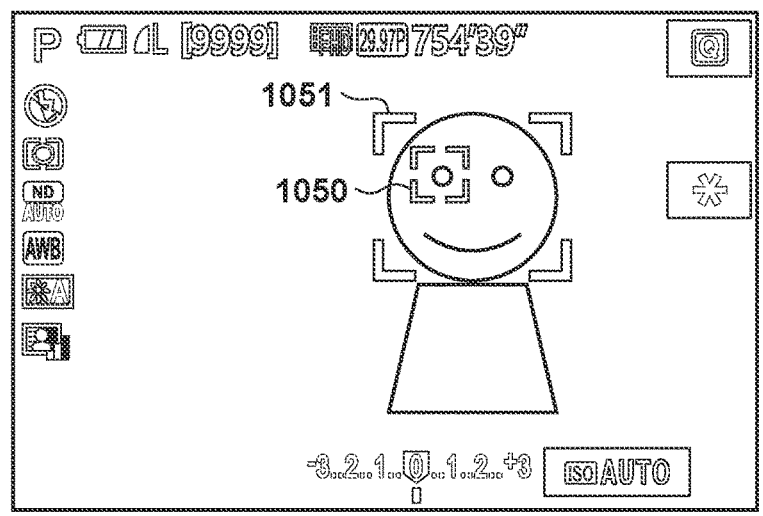
FIGS. 10A to 10C are views exemplifying screens for a time of a pupil AF mode.
Figure 10B:
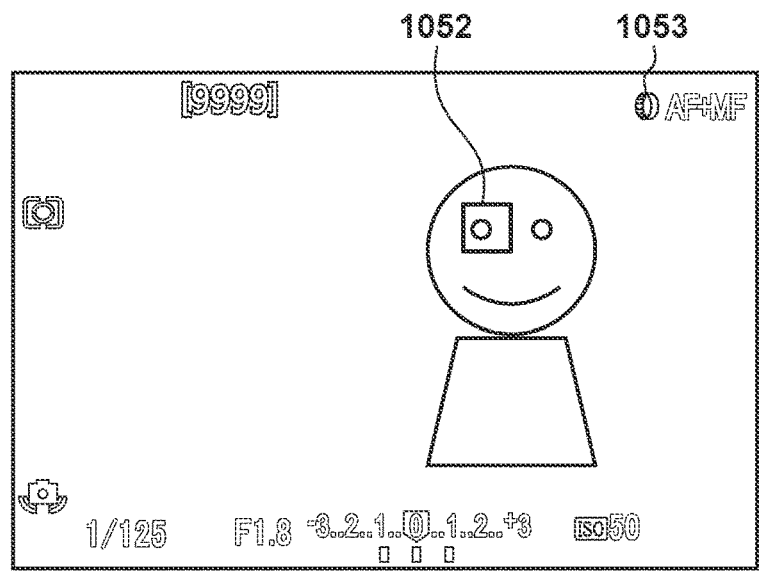
Figure 10C:
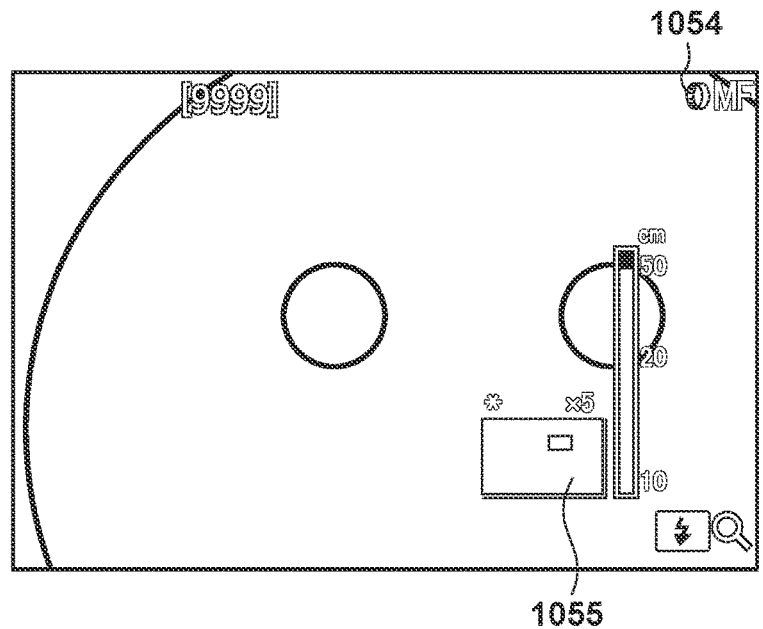

In addition, if it is determined in step S904 that pupil AF is off, the process proceeds to step S905, and the system control unit 201 determines whether pupil AF has succeeded. If it is determined that pupil AF has succeeded the process proceeds to step S905, and otherwise the process returns to step S906, and the temporary MF mode process is performed. When pupil AF does not succeed (when a pupil is not detected or when a pupil could not be focused on even if detected), the processing of step S906 is not performed (a focus adjustment operation is ignored). FIGS. 10A to 10C exemplify screens for a case where pupil AF succeeded. FIG. 10A indicates a shooting standby state in which a pupil has been detected, and a face frame 1051 and a pupil detection frame 1050 are displayed. FIG. 10B illustrates a screen for a case where, in this state, the shutter button 102 is half-pressed, AF is performed, and the pupil is focused on. A right eye 1052 of the specific object is focused on, and a wheel icon 1053 for explicitly notifying a user that AF+MF which was off in FIG. 10A has been turned on is displayed. A screen for when the controller wheel 104b is subject to a rotational operation in this state is illustrated in FIG. 10C. An MF setting screen that is similar to that in FIG. 5C is displayed, and a wheel icon 1054 for explicitly notifying a user that the focus distance can be changed by the controller wheel 104b is displayed. Furthermore, by making a setting for the enlargement factor in advance as described in the MF mode process, a user can focus on a more precise position while confirming a screen on which a live view image centered on a focused pupil is subject to an enlarged display.

In step S907, the system control unit 201 determines whether the shutter button 102 has been fully pressed and the second shutter switch signal SW2 has been detected, and if the shutter button 102 has been fully pressed the process proceeds to step S911, and otherwise the process proceeds to step S908.

In step S909, the system control unit 201 performs shooting process.

In step S908, the system control unit 201 determines whether a state in which the shutter button 102 is half pressed is continuing, in other words whether the first shutter switch signal SW1 remains on, and if a half-pressed state of the shutter button 102 is continuing the process returns to step S902, and otherwise the process proceeds to step S910.

In step S910, the system control unit 201, when the shooting process in step S909 ends or the half press of the shutter button 102 in step S908 has been canceled, determines whether the temporary MF mode process is continuing, and if it is determined that the temporary MF mode process is continuing the process proceeds to step S911, and otherwise the process returns to step S301 of FIG. 3.

In step S911, the system control unit 201, after canceling the temporary MF mode process and transitioning to the shooting standby state, returns to step S301 of FIG. 3.

By virtue of the present embodiment, AF+MF is automatically enabled after a pupil is focused on in accordance with a half press of the shutter button 102. By this, it becomes possible to smoothly perform an MF operation for finely adjusting a focus to a more detailed part of a specific object, it becomes possible to perform shooting without missing a shooting opportunity, and it is possible to improve usability.

In addition, although the present invention was explained in detail based on suitable embodiments, the present invention is not limited to these specific embodiments, and various forms of a scope that does not deviate from the gist of this invention are included in the invention. Furthermore, the above-described embodiment is merely one embodiment of the present invention, and different embodiments can be combined as appropriate. In the present embodiment, description was given by taking an electronic viewfinder as an example, but application may be made to an optical viewfinder. In addition, configuration may be such that the size of an AF frame changes in accordance with the situation, and there may be more than one AF frame. For example, if a plurality of AF points are displayed in a display unit in advance, as with an optical viewfinder or the like, a touch position may be indicated by, for example, changing the color of the plurality of AF points in accordance with the position and surface area of the finger that made the touch.

Note that the foregoing various control described as something that the system control unit 201 performs may be performed by one piece of hardware, and a plurality of pieces of hardware (for example, a plurality of processors, circuits, or modules) may distribute processing to perform control of the entirety of the apparatus.

In addition, although the present invention was explained in detail based on suitable embodiments, the present invention is not limited to these specific embodiments, and various forms of a scope that does not deviate from the gist of this invention are included in the invention. Furthermore, the above-described embodiment is merely one embodiment of the present invention, and different embodiments can be combined as appropriate.

In addition, although description was given by taking a face and a pupil of a person as examples of AF targets in the present embodiment, the face of an animal other than a person may be an AF target. In addition, although a pupil was given as an example of a detectable organ (part) of a face, there is no limitation to this, and similar process to that of the above-described embodiment can also be applied to another organ (part) such as a nose, a mouth, eyebrows or a cheek if it is an organ (part) for which it is possible to set as an AF target as with pupil AF.

Note that the present invention is not limited to a camera main body, and can also be applied to a control apparatus that communicates with an image capture apparatus (including a network camera) via wired or wireless communication to remotely control the image capture apparatus. Apparatuses that control an image capture apparatus remotely include a smart phone, a tablet PC and a desktop PC, for example. An image capture apparatus can be controlled remotely by notifying commands for causing the image capture apparatus to perform various operations and settings from the control apparatus side, based on operations performed on the control apparatus side and process performed on the control apparatus side. Also, a configuration may be adopted in which live view images captured with an image capture apparatus are received via cable or wireless communication to enable display on the control apparatus side. Also, a configuration may be adopted in which live view images captured with an image capture apparatus are received via cable or wireless communication to enable display on the control apparatus side. In such a case, such a control apparatus will execute AF control for controlling an AF mechanism of the image capture apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-093225, filed May 14, 2018 which is hereby incorporated by reference herein in its entirety.

What is claimed is:

1. An image capture control apparatus, comprising:
   a memory and at least one processor and/or at least one circuit to perform the operations of the following units:
   a detecting unit configured to detect a more detailed part of a specific object from an image, wherein the specific object is a part of the image;
   a first setting unit configured to set whether it is possible to designate the detailed part detected by the detecting unit as an auto focus (AF) target;
   a second setting unit configured to set whether to enable adjustment of a focus in accordance with MF in response to the specific operation while the operation for the shooting preparation instruction continues; and
   a control unit configured to control so as to
   in a case where the second setting unit is not set to enabled and there is a setting that makes it impossible for the first setting unit to designate the detailed part as an AF target, perform AF in accordance with a shooting preparation instruction, and not execute adjustment of a focus in accordance with manual focus (MF) even if a specific operation is performed while an operation for the shooting preparation instruction continues, and in a case where the second setting unit is not set to enabled and there is a setting that makes it possible for the first setting unit to designate the detailed part as an AF target, perform AF in accordance with a shooting preparation instruction, and execute adjustment of a focus in accordance with MF in response to a specific operation being performed while an operation for the shooting preparation instruction continues,
   wherein the control unit, if the detailed part is being detected by the detecting unit, enables adjustment of a focus in accordance with MF in response to the specific operation while the operation for the shooting preparation instruction continues, and
   if the detailed part is not being detected by the detecting unit, does not execute adjustment of a focus in accordance with MF even if the specific operation is performed while the operation for the shooting preparation instruction continues.

2. The apparatus according to claim 1, wherein the memory and at least one processor and/or at least one circuit further perform the operation of a switching unit configured to switch a focusing operation to one of AF and MF, and
   control by the control unit is executed if the focusing operation is set to AF.

3. The apparatus according to claim 2, wherein
   the control unit controls so as to not execute adjustment of a focus in accordance with MF even if the specific operation is performed before the operation for the shooting preparation instruction.

4. The apparatus according to claim 3, wherein
   if the specific operation is performed before the operation for the shooting preparation instruction, the control unit can make a setting relating to an image capture condition different to MF.

5. The apparatus according to claim 1, wherein the memory and at least one processor and/or at least one circuit further perform the operation of a notification unit configured to notify a user that adjustment of a focus in accordance with MF in response to the specific operation while the operation for the shooting preparation instruction continues is enabled.

6. The apparatus according to claim 1, wherein
   the detecting unit can detect a face as the specific object and an organ of the face from an image, and the detailed part is the organ of the face.

7. The apparatus according to claim 6, wherein
   the organ of the face is a pupil.

8. The apparatus according to claim 1, wherein
   the specific operation is an operation for causing a member, which can undergo a rotational operation and is for adjusting a focus in MF, to rotate.

9. A method of controlling an image capture control apparatus having a detecting unit operable to detect a more detailed part of a specific object from an image, wherein the specific object is a part of the image, the method comprising:
   setting whether it is possible to designate the detailed part detected by the detecting unit as an auto focus (AF) target; and
   setting whether to enable adjustment of a focus in accordance with MF in response to the specific operation while the operation for the shooting preparation instruction continues; and
   controlling to
   in a case where the adjustment of the focus in accordance with MF is not set to enabled and there is a setting that makes it impossible to designate the detailed part as an AF target, perform AF in accordance with a shooting preparation instruction, and not execute adjustment of a focus in accordance with manual focus (MF) even if a specific operation is performed while an operation for the shooting preparation instruction continues, and in a case where the adjustment of the focus in accordance with MF is not set to enabled and there is a setting that makes it possible to designate the detailed part as an AF target, perform AF in accordance with a shooting preparation instruction, and execute adjustment of a focus in accordance with MF in response to a specific operation being performed while an operation for the shooting preparation instruction continues, wherein controlling to, if the detailed part is being detected by the detecting unit, enable adjustment of a focus in accordance with MF in response to the specific operation while the operation for the shooting preparation instruction continues, and if the detailed part is not being detected by the detecting unit, not execute adjustment of a focus in accordance with MF even if the specific operation is performed while the operation for the shooting preparation instruction continues.

10. A non-transitory computer-readable storage medium storing a program for causing a computer to function as a first setting unit, a second setting unit and a control unit of an image capture control apparatus comprising a detecting unit configured to detect a more detailed part of a specific object from an image, wherein the specific object is a part of the image, wherein the first setting unit is configured to set whether it is possible to designate the detailed part detected by the detecting unit as an auto focus (AF) target, wherein the second setting unit is configured to set whether to enable adjustment of a focus in accordance with MF in response to the specific operation while the operation for the shooting preparation instruction continues, and wherein the control unit is configured to control so as to in a case where the second setting unit is not set to enabled and there is a setting that makes it impossible for the setting unit to designate the detailed part as an AF target, perform AF in accordance with a shooting preparation instruction, and not execute adjustment of a focus in accordance with manual focus (MF) even if a specific operation is performed while an operation for the shooting preparation instruction continues, and in a case where the second setting unit is not set to enabled and there is a setting that makes it possible for the setting unit to designate the detailed part as an AF target, perform AF in accordance with a shooting preparation instruction, and execute adjustment of a focus in accordance with MF in response to a specific operation being performed while an operation for the shooting preparation instruction continues, wherein the control unit, if the detailed part is being detected by the detecting unit, enables adjustment of a focus in accordance with MF in response to the specific operation while the operation for the shooting preparation instruction continues, and if the detailed part is not being detected by the detecting unit, does not execute adjustment of a focus in accordance with MF even if the specific operation is performed while the operation for the shooting preparation instruction continues.

* * * * *